United States Patent [19]

Sugiyama et al.

[11] 4,371,582

[45] Feb. 1, 1983

[54] INK JET RECORDING SHEET

[75] Inventors: Masatoshi Sugiyama; Ichiro Nakanishi; Akira Ogawa, all of Minami-ashigara; Masakazu Maekawa, Fujinomiya, all of Japan

[73] Assignee: Fuji Photo Film Co., Ltd., Kanagawa, Japan

[21] Appl. No.: 292,068

[22] Filed: Aug. 12, 1981

[30] Foreign Application Priority Data

Aug. 14, 1980 [JP] Japan ............................... 55/112083

[51] Int. Cl.$^3$ ...................... B32B 27/10; G01D 15/34

[52] U.S. Cl. ................................ 428/341; 346/135.1; 428/207; 428/211; 428/342; 428/500; 428/511; 428/537

[58] Field of Search ............... 428/500, 207, 537, 335, 428/511, 211, 341, 342, 328, 329; 427/286, 288, 261; 346/135.1, 1.1; 400/126; 162/162; 8/919

[56] References Cited

U.S. PATENT DOCUMENTS 4,269,891 5/1981 Minagawa ........................... 428/335
4,308,542 12/1981 Maekawa et al. ................ 346/135.1

FOREIGN PATENT DOCUMENTS 55-51583 4/1980 Japan .................................. 428/207

OTHER PUBLICATIONS

IBM Technical Disclosure Bulletins, vol. 20, No. 9, Feb. 1978, p. 3407; vol. 21, No. 6, Nov. 1978.

*Primary Examiner*—Thomas J. Herbert, Jr.
*Attorney, Agent, or Firm*—Sughrue, Mion, Zinn, Macpeak & Seas

[57] ABSTRACT

An ink jet recording sheet containing a basic latex polymer is described, which can provide images, having excellent water resistance properties and high image density, by jetting thereonto an aqueous ink containing a water-soluble dye. In the case of applying a multicolor ink jet recording to the recording sheet, color images having excellent color reproduction are obtained.

13 Claims, No Drawings

INK JET RECORDING SHEET

FIELD OF THE INVENTION

This invention relates to ink jet recording sheets and, more particularly, to ink jet recording sheets capable of forming highly water-resistant ink jet prints or records thereon by aqueous inks for ink jet recording.

BACKGROUND OF THE INVENTION

Since ink jet recording produces little or no noise, and makes high-speed recording possible using plain paper as the recording papers, ink jet recording has recently become widely used, e.g., for terminal output printers of computers. Also, multicolor recording can be easily performed by using plural ink nozzles, and multicolor ink jet recording by various ink jet recording systems have been investigated.

Examples of ink jet recording sheets used for ink jet recording include wood free papers, slip-writing continuous paper webs, art papers, coated papers, low density papers without size, ink jet recording papers having relatively good ink absorbing property and showing less blotting of ink as described in Japanese Patent Application (OPI) Nos. 53012/77, 74340/77 and 49113/78 (the term "OPI" as used herein refers to a "published unexamined Japanese patent application"), fabric, plastic films having ink absorbing surfaces, wood boards, metallic plates, etc.

Ink jet recording (or printing) is generally applied to these ink jet recording sheets by aqueous inks. Aqueous inks for ink jet printing are typically composed of water-soluble dyes, humectants, dye-solubilizing agents, mold inhibitors, water, water-miscible organic solvents, etc., as described in Japanese Patent Application (OPI) Nos. 89534/74, 97620/74, 143602/75, 102407/75, 129310/76, 137506/76, 137505/76, 115106/76, 139408/76, 12008/77, 12009/77, 12010/77, 74406/77, 77706/78, 119107/78 and 119108/78, and Japanese Patent Publication Nos. 14643/77, 14644/77, and 20882/78.

Ink jet records obtained by applying conventionally known aqueous inks on the above-described known ink jet recording sheets exhibit the fault that when the records are splashed or wet with water, the records of dyes blot or diffuse completely due to the poor water resistance property thereof. Furthermore, when the records are preserved for a long period of time in a high humidity condition, the ink jet record also blots.

When an ink jet recording paper contains a dyeing component and the amount of jetted ink is small, as in the case of monochromatic ink jet recording, the water resistance properties of the records may be satisfactory for practical purpose if a dye or dyes having good water resistance properties are used. However, in the case of multicolor ink jet recording, the amount of jetted inks is relatively large, and records having sufficient water resistance properties cannot be obtained even when the ink jet recording paper contains good individual dye components. When papers recorded by ink jet printing are used, for example, for outdoor notifications or advertisements, the records are required to have particularly good water resistance properties but multicolor ink jet records formed by the combination of conventional ink jet recording papers and ink jet recording inks have been utterly unsuitable for such practical use.

Hitherto, dye mordants such as dicyandiamide condensates, polyamine, polyethyleneimine, etc., have been widely known as commercially available products, and when these mordants are incorporated in ink jet recording sheets, the water resistance properties of the images formed by ink jet recording increases considerably.

However, since the mordanting power of these mordants is limited, and the mordant itself has a high water-solubility, sufficiently high water resistance properties of ink jet records is not obtained even by using these mordants. In images formed by ink jet recording using aqueous ink jet recording inks, in particular, intermediate tone multicolor images formed by ink jet recording, if the dyes elute to even a slight extent, images will blot when the images are splashed or wet by water to drastically reduce the quality of the images. By using conventionally known mordants, it is difficult to completely prevent the dyes of images from dissolving into water, and thus it is difficult to render ink jet recording sheets water resistant.

Furthermore, in the case of multicolor ink jet recording, it frequently happens that inks are ejected from 2 or more nozzles of an ink jet printer and two or more ink dots overlap at various points on a recording paper, or in a more extreme case as many as 4 color ink dots may overlap at some points of the recording paper. Therefore, if in this case the prior ink drop is not quickly absorbed into the inside of the recording paper, the ink drop is mixed with the subsequent ink drop ejected to the same point and flows together from that point or is scattered by the subsequent ink drop to stain the white portions of the recording paper. Also, in such a case, if the records formed by jet ink recording are rubbed in handling of the recording paper, the ink drops remaining without being absorbed stain the recording paper. Therefore, recording papers having particularly excellent ink absorbing properties are required for successful multicolor ink jet recording.

However, a recording paper having good ink absorbing properties generally shows not only spreading of an ink dot in the planar direction of the recording paper, but also a large permeation of the ink dot into the inside of the recording paper. For example, a paper manufactured at a high bulk density without using size has a very high ink absorbing property, and such ink absorbing property is sufficiently enduring for multicolor ink jet recording, but has such faults as that (1) the ink dot on the paper spreads largely in a planar direction, reducing the resolving power of the image formed; (2) the ink permeating deeply into the inside of the paper reduces the density of the image and makes the image whitish, together with the scattering of light due to the voids in the paper. Thus, a clear, sharp image cannot be obtained. Also, when four-color image by cyan, magenta, yellow, and black inks is formed on a recording paper having good ink absorbing property by ink jet recording, the ink drops ejected first permeate most deeply into the inside of the paper to reduce the color reproducibility.

Thus, for obtaining color images having good color density, resolving power, and color reproducibility by multicolor ink jet recording, such properties, which are contrary to each other, that spreading of the coloring components in the ink drops to the longitudinal direction of a recording paper is less, permeation of the coloring components in the ink drops in the inside of the recording paper is less, the coloring components desirably exist on the surface of the recording paper, and the recording paper has good ink absorbing property, are required.

Various attempts have been made to overcome the foregoing problems. For example, Japanese Patent Application (OPI) No. 53012/77 discloses an ink jet recording paper wherein a coating material is applied on the surface of a base paper having a low degree of sizing and is permeated in the inside of the recording paper. Also, Japanese Patent Application (OPI) No. 49113/78 discloses an ink jet recording paper prepared by impregnating a paper containing a fine powder of a urea-formalin resin with a water-soluble polymer. Furthermore, Japanese Patent Application (OPI) No. 74340/77 discloses an ink jet recording paper having a specific gas permeability and having an appropriate ink absorbing time.

However, the techniques described in the foregoing patent applications are directed to improving the resolving power of images, the density thereof, etc., by sacrificing the ink absorbing property, and hence, although the resolving power, density, etc., of images formed may be improved to some extent, the ink absorbing property is reduced. Therefore, such papers are generally somewhat unsatisfactory as recording papers for multicolor ink jet recording. Thus, a continuing need has existed for recording sheets completely for multicolor ink jet printing.

SUMMARY OF THE INVENTION

A first object of this invention is to provide an ink jet recording sheet having high water resistance properties.

A second object of this invention is to provide an ink jet recording sheet capable of preventing blotting of inks during ink jet recording.

A third object of this invention is to provide an ink jet recording sheet capable of providing high-quality ink jet records having high image density and good resolving power and color reproducibility.

As the result of various investigations, the inventors have discovered that the above-described objects of this invention can be attained by incorporating at least one of basic latex polymers in an ink jet recording sheet.

Thus, according to this invention, an ink jet recording sheet is provided for forming recorded images by jetting thereonto an aqueous ink containing a water-soluble dye, comprising a base support containing at least one basic latex polymer.

DETAILED DESCRIPTION OF THE INVENTION

When ink jet recording is applied on the ink jet recording sheet containing a basic polymer latex according to this invention with an aqueous ink containing a direct dye or an acid dye having an anionic dissociable group, the dye in the aqueous ink is ionically bonded with the basic polymer latex in the recording sheet. Thus the dye is insolubilized, and dissolution of the dye can be completely prevented.

Since the basic polymer latex is insoluble in water and has a strong mordanting power for the dye, the water resistance properties of the images formed by ink jet recording are excellent, and when the recorded images are splashed with water or immersed in water for a long period of time, no change of images occurs.

More particularly, in multicolor ink jet recording, it is very desirable to use a recording sheet having good ink absorbing properties for preventing the occurrence of flowing of ink as described above, but the use of conventional recording sheets having good ink absorbing properties encounters inevitably the reduction in density, resolving power, and color reproducibility of images. However, when ink jet recording is applied onto the ink jet recording sheet of this invention, prepared by incorporating a basic polymer latex into an ink jet recording sheet, flowing of ink does not occur during ink jet recording and very clear ink jet records having excellent density, resolving power, and color reproducibility are obtained. This is because the dye in the aqueous ink ejected is selectively absorbed on the basic polymer latex in the recording sheet, and thus the dye does not diffuse in the planar direction and to the interior of the recording sheet. Then, when water, a water-miscible organic solvent, a humectant, etc., contained in the aqueous ink diffuse in the planar direction and to the interior of the recording sheet, flowing of ink does not occur.

The basic polymer latex used in this invention preferably contains a basic polymer latex represented by formula (I)

$$-(A)_x-(B)_y-(C)_z- \quad (I)$$

wherein $-(A)-$ represents a polymeric unit formed by copolymerizing a copolymerizable monomer containing a tert-amino group or a quaternary ammonium group; $-(B)-$ represents a polymeric unit formed by copolymerizing a copolymerizable monomer containing at least two ethylenically unsaturated groups; $-(C)-$ represents a polymeric unit formed by copolymerizing copolymerizable ethylenically unsaturated monomers other than those used for forming $-(A)-$ and $-(B)-$; x represents from 10 to 99 mol%; y represents from 0 to 10 mol%; and z represents from 0 to 90 mol%.

Preferred examples of the basic latex polymer used in this invention are described below.

In formula (I), the polymeric unit $-(A)-$ is preferably represented by formula (II), (III), or (IV)

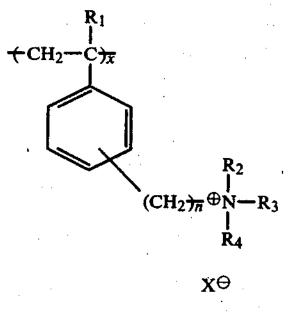
(II)

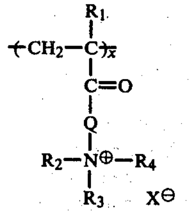
(III)

-continued

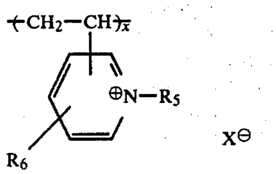

(IV)

In formula (II):

$R_1$ represents a hydrogen atom or a lower alkyl group having from 1 to 6 carbon atoms (e.g., a methyl group, an ethyl group, an n-hexyl group, etc.).

$R_2$, $R_3$, and $R_4$, which may be the same or different, each represents an alkyl group having from 1 to 6 carbon atoms, or an aralkyl group having from 7 to 10 carbon atoms, and two of said $R_2$, $R_3$, and $R_4$ may combine with each other to form a cyclic structure (together with the nitrogen atom).

The alkyl group and aralkyl group include substituted alkyl group and substituted aralkyl group respectively; examples of the alkyl group are, for example, a methyl group, an ethyl group, an n-propyl group, an n-hexyl group, etc.; examples of the substituted alkyl group are, for example, a hydroxyalkyl group (e.g., a 2-hydroxyethyl group, a 3-hydroxypropyl group, a 3-chloro-2-hydroxypropyl group, etc.), an alkoxyalkyl group (e.g., a methoxymethyl group, a 2-methoxyethyl group, etc.), a cyanoalkyl group (e.g., a 2-cyanoethyl group, etc.), a halogenated alkyl group (e.g., a 2-chloroethyl group, etc.), an allyl group, a 2-butenyl group, a propargyl group, etc.; examples of the aralkyl group include a benzyl group, a phenethyl group, a diphenylmethyl group; and examples of the substituted aralkyl group are, for example, an alkylaralkyl group (e.g., a 4-methylbenzyl group, a 2,5-dimethylbenzyl group, etc.), an alkoxyaralkyl group (e.g., a 4-methoxybenzyl group, etc.), a cyanoaralkyl group (e.g., a 4-cyanobenzyl group, etc.), a halogenated aralkyl group (e.g., a 4-chlorobenzyl group, etc.), and the like.

The cyclic structure formed together with the nitrogen atom by the combination of $R_2$, $R_3$, and $R_4$ can be, e.g., a cyclic structure formed by $R_2$ and $R_3$ (e.g., pyrrolidine, piperidine, morpholine, etc.; in this case, $R_4$ represents one of the groups described above) and the cyclic structure formed by $R_2$, $R_3$, and $R_4$ (e.g., imidazole, 2-methylimidazole, triazole, pyridine, 2-methylpyridine, 3-methylpyridine, 4-methylpyridine, quinuclidine, etc.).

$X^{\ominus}$ represents an anion such as a halogen ion (e.g., a chlorine ion, a bromine ion, etc.), an alkylsulfate ion (e.g., a methylsulfate ion, an ethylsulfate ion, etc.), an alkyl- or arylsulfonate ion (e.g., a methanesulfonate ion, a benzenesulfonate ion, etc.), an acetate ion, a sulfate ion, etc.

Lastly, n represents an integer of 0 to 2.

In formula (III):

$R_1$, $R_2$, $R_3$, and $R_4$ have the same meanings as $R_1$, $R_2$, $R_3$, and $R_4$, respectively, in the case of formula (II).

Q represents a divalent group having from 1 to 20 carbon atoms, such as an alkylene group (e.g., a methylene group, an ethylene group, etc.), an arylene group (e.g.,

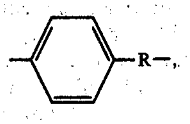

wherein R is an alkylene group having from 1 to 6 carbon atoms or a chemical bond), —O—R'— (wherein R' is an alkylene group having from 1 to 6 carbon atoms, such as —O—$CH_2CH_2$—, —O—$CH_2CH_2CH_2$—),

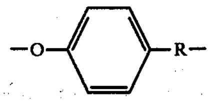 or 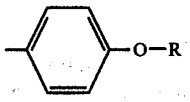

(wherein R is the same as above), —NH—R'—

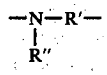

(wherein R' is the same as above, R'' represents an alkyl group having from 1 to 6 carbon atoms or an aralkyl group having from 7 to 12 carbon atoms), or

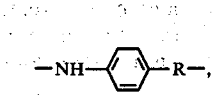, 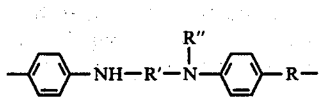

(wherein R, R', and R'' are the same as above), etc.

In formula (IV):

$R_5$ represents an alkyl group having from 1 to 12 carbon atoms or an aralkyl group having from 7 to 12 carbon atoms, and said alkyl groups and aralkyl groups include substituted alkyl groups and substituted aralkyl groups, respectively, as noted in regard to $R_2$, $R_3$, and $R_4$.

$R_6$ represents a hydrogen atom or an alkyl group having from 1 to 4 carbon atoms, such as a methyl group, an ethyl group, etc.

In formula (I), the polymeric unit represented by $\leftarrow B \rightarrow$ preferably is derived from a monomer having the formula (V)

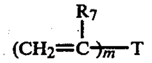

(V)

wherein $R_7$ represents a hydrogen atom or a methyl group, T represents a group bonding to the vinyl group, such as an amide (e.g., sulfonamide, etc.), an ester (e.g., sulfonic acid ester, etc.), an alkylene (e.g., methylene, ethylene, trimethylene, etc.), arylene (e.g., phenylene, phenyleneoxycarbonyl, etc.), and m represents an integer of 2 to 4.

Examples of the monomer used to form $\leftarrow B \rightarrow$ are, for example, divinylbenzene, ethylene glycol dimethacrylate, propylene glycol dimethacrylate, neopentyl glycol dimethacrylate, tetramethylene glycol diacrylate, trimethylolpropane triacrylate, etc.

In formula (I), the polymeric unit represented by $\leftarrow C \rightarrow$ is a copolymerizable ethylenically unsaturated polymeric unit derived from, for example, ethylene, propylene, butene-1, isobutene, styrene, α-methylstyrene, vinyltoluene, acrylic acid, methacrylic acid, a monoethylenically unsaturated ester of fatty acid (e.g., vinyl acetate, allyl acetate, etc.), an ethylenically unsaturated monocarboxylic acid or dicarboxylic acid ester (e.g., methyl methacrylate, ethyl acrylate, n-butyl acrylate, n-butyl methacrylate, n-hexyl methacrylate, n-octyl acrylate, benzyl acrylate, cyclohexyl methacrylate, 2-ethylhexyl acrylate, etc.), a monoethylenically unsaturated compound (e.g., acrylonitrile, etc.), or a diene (e.g., butadiene, isoprene, etc.), etc. The polymeric unit –(B)– may contain two or more polymeric units described above.

In particularly preferred embodiments, the basic latex polymers comprise polymeric units wherein —A— is as follows:

In formula (II):

$R_1$ is a hydrogen atom;

$R_2$, $R_3$, and $R_4$, which may be the same or different, each is an alkyl group having from 1 to 3 carbon atoms or an alkyl group (1-3 carbon atoms) substituted with a hydroxy group, or $R_2$ and $R_3$ combine with each other to form a piperidine ring together with the nitrogen atom, and $R_4$ is an unsubstituted alkyl group having from 1 to 3 carbon atoms, an alkyl group (1-3 carbon atoms) substituted with a hydroxy group, or an aralkyl group.

In formula (III):

$R_1$ is a hydrogen atom or a methyl group;

$R_2$, $R_3$, and $R_4$, which may be the same or different, each is an alkyl group having from 1 to 3 carbon atoms or an alkyl group (1-3 carbon atoms) substituted with a hydroxy group, or $R_2$ and $R_3$ combine with each other to form a piperidine ring together with the nitrogen atom, and $R_4$ is an unsubstituted alkyl group having from 1 to 3 carbon atoms, an alkyl group (1-3 carbon atoms) substituted with a hydroxy group, or an aralkyl group; and Q is —O—R′— or —NH—R′— (wherein R′ is ethylene or propylene).

In formula (IV):

$R_5$ is an alkyl group having from 1 to 4 carbon atoms, an alkyl group (1-4 carbon atoms) substituted with a hydroxy group, or an aralkyl group having from 7 to 9 carbon atoms; and $R_6$ is a hydrogen atom or a methyl group.

Preferred examples of the polymeric units represented by –(B)– are divinylbenzene, ethylene glycol dimethacrylate, and propylene glycol dimethacrylate.

Preferred examples of the polymeric unit shown by –(C)– are styrene, cyclohexyl methacrylate, methyl methacrylate, etc.

x is preferably from 30 to 99 mol%, y is from 1 to 8 mol%, and z is from 10 to 80 mol%.

$X^{\ominus}$ is preferably a halogen ion (e.g., a chlorine ion), an alkylsulfate ion (e.g., an ethylsulfate ion), or an acetate ion.

Some preferred examples of basic latex polymers useful in this invention are illustrated below, but latex polymers useful in this invention are not limited to these particular polymers.

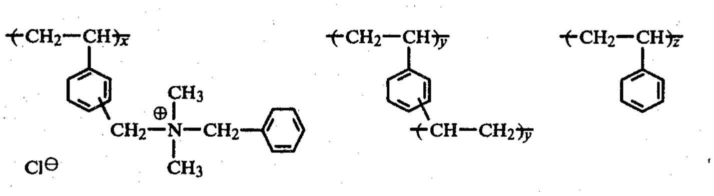
(1)

x:y:z = 49:2:49

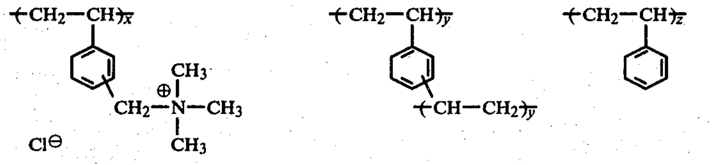
(2)

x:y:z = 49:2:49

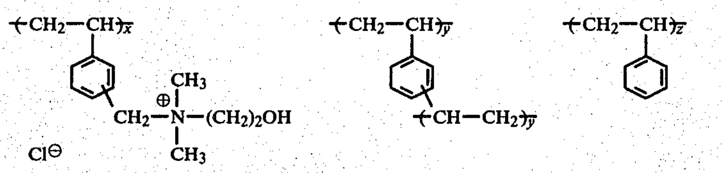
(3)

x:y:z = 49:2:49

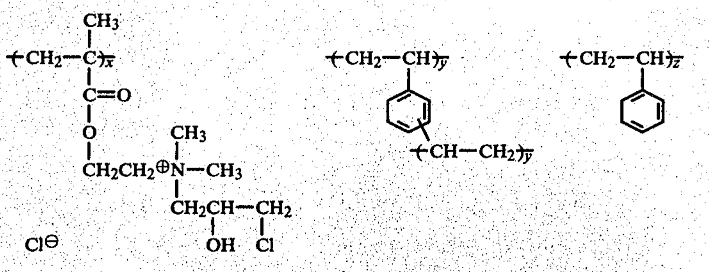
(4)

x:y:z = 48:4:48

-continued
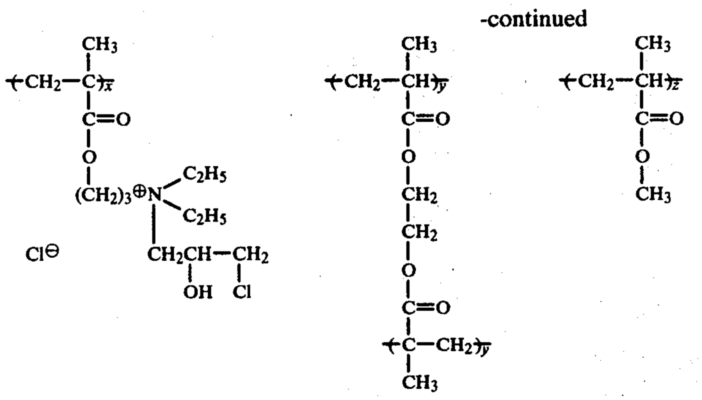
(5)
x:y:z = 48:4:48
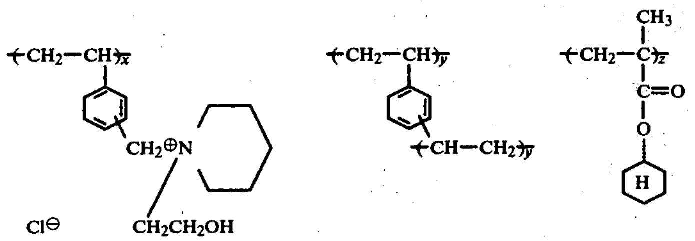
(6)
x:y:z = 49:2:49
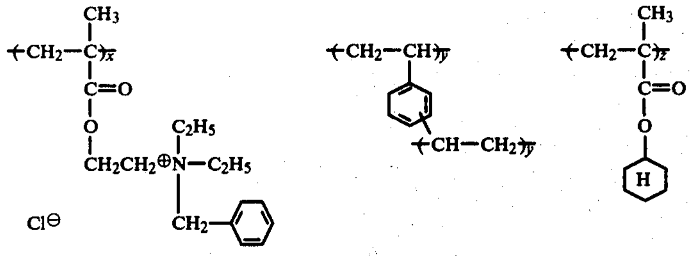
(7)
x:y:z = 48:4:48
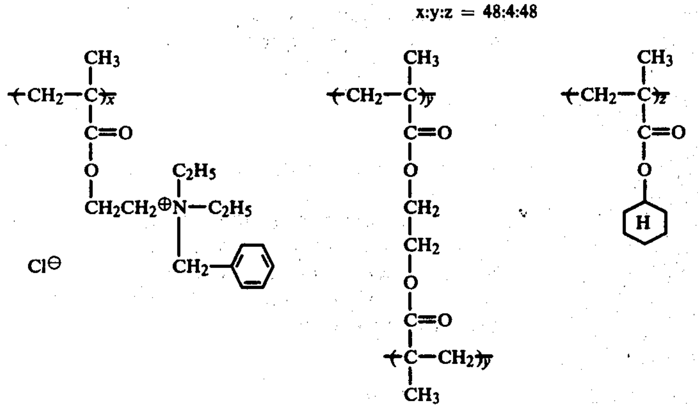
(8)
x:y:z = 49:2:49
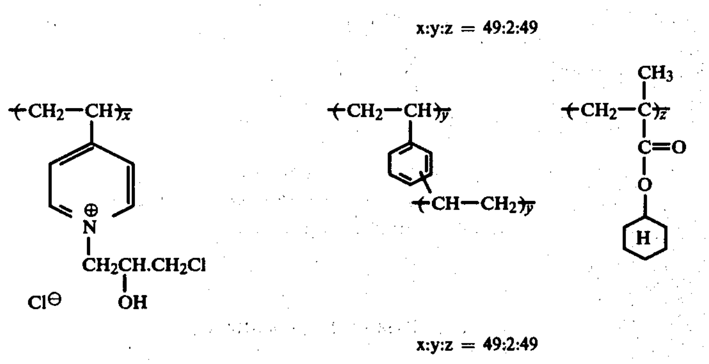
(9)
x:y:z = 49:2:49

-continued

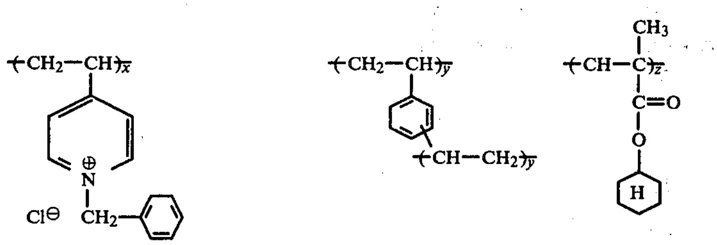

(10)

x:y:z = 49:2:49

The basic latex polymers used in this invention can be prepared by ordinary emulsion polymerization techniques, as described, for example, in Japanese Patent Application (OPI) Nos. 145529/79, 155835/79, 126027/79 and 73440/76. The emulsion polymerization for preparing the basic latex polymer is performed generally in the presence of a free-radical initiator (e.g., use of potassium persulfate and potassium hydrogen sulfite together) and at least one surface active agent selected from an anionic surface active agent (e.g., Triton 770, trademark for product of Rhom & Haas Co.), a cationic surface active agent (e.g., cetyltrimethylammonium chloride, stearyltrimethylammonium chloride, etc.), and a nonionic surface active agent (e.g., polyvinyl alcohol).

The latex monomer having the polymeric units shown by formulae (II) and (III) can be prepared by the following two methods.

In one method, the latex polymer can be prepared by emulsion polymerizing the copolymerizable monomer having at least two ethylenically unsaturated groups for forming ⟵B⟶ and the copolymerizable ethylenically unsaturated monomer for forming ⟵C⟶ with an unsaturated monomer represented by formula (II') or (III')

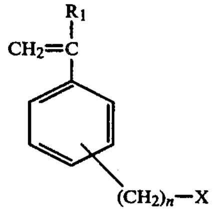

(II')

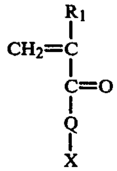

(III')

wherein $R_1$, X, n, and Q have the same meanings as described above,
and then converting the product into a quaternary compound with an amine having the structure

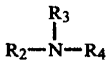

wherein $R_2$, $R_3$, and $R_4$ have the same meanings as defined above.

In another method, the latex polymer can be prepared by emulsion polymerizing the copolymerizable ethylenically unsaturated monomers ⟵B⟶ and ⟵C⟶ with the unsaturated monomer shown by following formula (II'') or (III'')

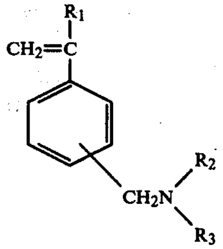

(II'')

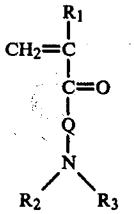

(III'')

wherein $R_1$, $R_2$, $R_3$, and Q have the same meanings as defined above, and then converting the product into a quaternary compound with the compound of the formula $R_4$—X wherein $R_4$ and X have the same meanings as defined above.

Latex polymer having the polymeric unit shown by formula (IV) can be prepared by emulsion polymerizing the copolymerizable unsaturated monomers for forming ⟵B⟶ and ⟵C⟶ with an unsaturated monomer represented by formula (IV')

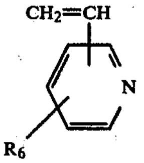

(IV')

wherein $R_6$ has the same meaning as defined above, and then converting the product into a quaternary compound using a compound having the formula $R_5$—X wherein $R_5$ and X have the same meanings as defined above.

The basic polymer used in this invention is incorporated in or on a support such as paper, cloth, nonwoven fabric, plastic film, wood board, a metallic plate, a glass sheet, etc., by internal addition, immersion, coating, etc. The content of the basic latex polymer is preferably from 0.1 to 20 g, and more preferably from 0.5 to 5 g, per square meter of the support.

The content of the basic latex polymer depends upon the kind and composition of the latex polymer, the amount of aqueous ink jetted per unit area, the type and amount of the dye contained in the aqueous ink, the type of the support, and the manner of applying the latex polymer and can be easily determined by a person skilled in the art.

As noted above, one method of applying the basic latex polymer to a support comprises an internal addition method, wherein the polymer is added to a pulp dispersion during manufacturing of a paper support. Another is an immersion method of absorbing the polymer into the voids of an absorbing support such as a paper, a cloth, etc., and a coating method of forming a coated layer of the polymer on the surface of a support. Among these methods, the coating method is most suitable, since in this case a very good water resistance effect is obtained using a small amount of the basic latex polymer and clear recorded images are obtained.

A coating composition containing the basic latex polymer can be coated on a support by air knife coater, blade coater, bar coater, gravure coater, curtain coater, roll coater, spray coater, etc.

The recording sheet of this invention may further contain, in addition to the basic latex polymer, a pigment generally used for paper processing, a water-soluble polymer, other latex than that of this invention, a synthetic resin emulsion, a humectant, a surface active agent, a dye, an ultraviolet absorbent, a pigment dispersant, a defoaming agent, a mold inhibitor, water resisting agent, etc.

Examples of the pigment that can be used include clay, talc, calcium carbonate, barium sulfate, zinc oxide, titanium white, synthetic silicate, silica, diatomaceous earth, fine polyethylene powder, fine polystyrene powder, fine urea resin powder, etc.; by using such pigments, desirable properties such as an ink absorption, stickiness prevention, whiteness, smoothness, etc., can be imparted to the recording sheets.

Examples of the water-soluble polymer that can be used include oxidized starch, cationic starch, gelatin, casein, hydroxyethyl cellulose, polyvinyl alcohol, polyacrylamide, polyethylene oxide, polyvinylpyrrolidone, polyethyleneimine, polyamide polyamine, polyamide-polyamine-epichlorohydrin resin, etc.; the water-soluble polymer is used for the purpose of preventing the occurrence of flowing of ink, controlling the absorption of ink, and adhesion of pigment.

A latex or emulsion such as a styrene-butadiene copolymer, a methyl methacrylate-butadiene copolymer, an acrylic acid ester copolymer, etc., can be used for the purpose of adhesion of pigment and control of the ink absorbing property.

Furthermore, the recording sheet may further contain a humectant or a surface active agent, such as glycerol, polyethylene glycol, etc., for improving the wetting property and water absorbing property of the ink jet recording layer; a dye can be added to provide blue tint; an ultraviolet absorbent can be added for improving the light resistance of the dye in the aqueous ink; an antioxidant, such as substituted-2-hydroxyphenylbenzotriazole (Tinuvin, trademark of Ciba-Geigy AG), hydroxybenzophenone, tert-butylhydroxyanisole, butyrated hydroxytoluene, 2,5-tert-butylhydroquinone, substituted chromanol, etc., can be added. The sheet may also contain: a dispersing agent for dispersing pigment; a defoaming agent for defoaming the coating composition; a mold inhibitor; a water resisting agent for crosslinking mainly the water-soluble polymer; etc.

Any water-soluble dyes having at least one sulfo group in the molecule can be used as the water-soluble dye contained in the aqueous ink used in this invention. Examples of the dyes used in this invention are disclosed, for example, in Japanese Patent Application (OPI) Nos. 89534/74, 96105/77, 146307/77, 77706/78, and 89811/79 and Japanese Patent Publication Nos. 16245/79, 16243/79, 16244/79 and 146307/77. Preferred examples are shown below:

| | | |
|---|---|---|
| I. Direct Dye | | |
| C.I. Direct Yellow | 27 | (C.I. 13950) |
| C.I. Direct Yellow | 28 | (C.I. 19555) |
| C.I. Direct Yellow | 33 | (C.I. 29020) |
| C.I. Direct Yellow | 39 | |
| C.I. Direct Yellow | 58 | |
| C.I. Direct Yellow | 86 | |
| C.I. Direct Yellow | 100 | |
| C.I. Direct Red | 63 | |
| C.I. Direct Red | 75 | (C.I. 25380) |
| C.I. Direct Red | 79 | (C.I. 29065) |
| C.I. Direct Red | 80 | (C.I. 35780) |
| C.I. Direct Red | 83 | (C.I. 29225) |
| C.I. Direct Red | 99 | |
| C.I. Direct Red | 220 | |
| C.I. Direct Red | 224 | |
| D.I. Direct Violet | 47 | (C.I. 25410) |
| C.I. Direct Violet | 48 | (C.I. 29125) |
| C.I. Direct Violet | 51 | (C.I. 27905) |
| C.I. Direct Violet | 90 | |
| C.I. Direct Violet | 94 | |
| C.I. Direct Blue | 1 | (C.I. 24410) |
| C.I. Direct Blue | 8 | |
| C.I. Direct Blue | 71 | (C.I. 34140) |
| C.I. Direct Blue | 76 | (C.I. 24411) |
| C.I. Direct Blue | 78 | (C.I. 34200) |
| C.I. Direct Blue | 80 | |
| C.I. Direct Blue | 86 | (C.I. 74180) |
| C.I. Direct Blue | 90 | |
| C.I. Direct Blue | 106 | (C.I. 51300) |
| C.I. Direct Blue | 108 | (C.I. 51320) |
| C.I. Direct Blue | 123 | (C.I. 26705) |
| C.I. Direct Blue | 163 | (C.I. 33560) |
| C.I. Direct Blue | 165 | |
| C.I. Direct Black | 19 | (C.I. 35255) |
| C.I. Direct Black | 38 | (C.I. 30235) |
| C.I. Direct Black | 71 | (C.I. 25040) |
| C.I. Direct Black | 74 | (C.I. 34180) |
| C.I. Direct Black | 75 | (C.I. 35870) |
| C.I. Direct Black | 112 | |
| C.I. Direct Black | 117 | |
| II. Acid Dye | | |
| C.I. Acid Yellow | 17 | (C.I. 18965) |
| C.I. Acid Yellow | 19 | |
| C.I. Acid Yellow | 25 | (C.I. 18835) |
| C.I. Acid Yellow | 29 | (C.I. 18900) |
| C.I. Acid Yellow | 38 | (C.I. 25135) |
| C.I. Acid Yellow | 49 | |
| C.I. Acid Yellow | 59 | |
| C.I. Acid Yellow | 61 | |
| C.I. Acid Yellow | 72 | |
| C.I. Acid Red | 1 | (C.I. 18050) |
| C.I. Acid Red | 8 | (C.I. 14900) |
| C.I. Acid Red | 32 | (C.I. 17065) |
| C.I. Acid Red | 37 | (C.I. 17045) |
| C.I. Acid Red | 42 | (C.I. 17070) |
| C.I. Acid Red | 57 | |
| C.I. Acid Red | 115 | (C.I. 27200) |
| C.I. Acid Red | 119 | |

-continued

| | | |
|---|---|---|
| C.I. Acid Red | 131 | |
| C.I. Acid Red | 133 | (C.I. 17995) |
| C.I. Acid Red | 134 | (C.I. 24810) |
| C.I. Acid Red | 154 | (C.I. 24800) |
| C.I. Acid Red | 186 | (C.I. 18810) |
| C.I. Acid Red | 249 | (C.I. 18134) |
| C.I. Acid Red | 254 | |
| C.I. Acid Red | 256 | |
| C.I. Acid Violet | 11 | (C.I. 17060) |
| C.I. Acid Violet | 34 | (C.I. 61710, 61800) |
| C.I. Acid Violet | 75 | |
| C.I. Acid Blue | 29 | (C.I. 20460) |
| C.I. Acid Blue | 126 | |
| C.I. Acid Blue | 171 | |
| C.I. Acid Blue | 175 | |
| C.I. Acid Blue | 183 | |
| C.I. Acid Black | 1 | (C.I. 20470) |
| C.I. Acid Black | 24 | (C.I. 26370) |
| C.I. Acid Black | 26 | (C.I. 27070) |
| C.I. Acid Black | 48 | (C.I. 65005) |
| C.I. Acid Black | 52 | (C.I. 15711) |
| C.I. Acid Black | 58 | |
| C.I. Acid Black | 60 | |
| C.I. Acid Black | 107 | |
| C.I. Acid Black | 109 | |
| C.I. Acid Black | 119 | |
| C.I. Acid Black | 131 | |
| C.I. Acid Black | 155 | |

Furthermore, the aqueous inks used in this invention may contain various additives which can be used for ordinary aqueous inks, such as humectants, solubilizing agents, surface active agents, etc.

One important advantage of this invention is that ink jet records having a high water resistance property are easily obtained. Another advantage is that there are no occurrences of flowing and blotting of ink at ink jet recording. Still another advantage is that color images having high image density and resolving power as well as good color reproducibility when used for color jet printing are obtained.

The invention is explained in more detail below by reference to examples.

EXAMPLE 1

An aqueous solution containing 5% by weight of a polymer shown in Table 1, 5% by weight gelatin, and 5% by weight synthetic aluminum silicate was coated on one surface of a base paper having a weight capacity of 100 g/m$^2$ and a degree of sizing of 25 g/m$^2$ at a dry solid content of 7.5 g/m$^2$ by means of an air knife coater and passed through a calender to provide ink jet Recording Sheets 1 to 5.

On each of the Recording Sheets 1 to 5 was formed a monochromatic image or a 2- to 4-color image by ejecting up to 4-colored aqueous inks (cyan, magenta, yellow and black) using a multicolor ink jet printer.

The water resistance property and the image density of each record thus recorded were measured and the results are shown in Table 1.

TABLE 1

| Recording Sheet No. | Polymer | Measurement Result: Water Resistance* Property of Image | Measurement Result: Image** Density |
|---|---|---|---|
| 1 | Compound (1) | Excellent | 1.98 |
| 2 | Compound (8) | " | 1.93 |
| 3 | Compound (5) | " | 1.94 |
| 4*** | Dicyandiamide**** Condensate | Good | 1.85 |
| 5*** | None | Poor | 1.65 |

*The sheet recorded by ink jet recording was immersed in water and immediately withdrawn, followed by drying.
Excellent: No flowing and blotting of image, and no change of image.
Good: A little flowing and blotting of image at monochromatic portion, and large flowing and blotting of image at three-color portion.
Poor: Large flowing of image and large change of image.
**The density of the cyan ink.
***Comparison example.
****Sanfix 70, made by Sanyo Chemical Industries, Ltd.

As is clear from the results shown in Table 1, in the case of using the Recording Sheets 1 to 3 of this invention, images having an excellent water resistance property were obtained, and no change in the image was observed. Also, the images formed on the recording sheets of this invention had higher image density than the images formed on the comparison sheets.

The cyan, magenta, yellow, and black aqueous inks used in this example were prepared by stirring the compositions shown below for 1 hour while heating to 50°-60° C., and then pressure-filtering the mixture through Microfilter FM type of 0.8μ, and 47 φ (made by Fuji Photo Film Co., Ltd.).

| | parts |
|---|---|
| Cyan Ink: | |
| Dye (sodium copper phthalocyanine tetrasulfonate) | 2.4 |
| Diethylene glycol monobutyl ether | 0.5 |
| N—Methyl-2-pyrrolidone | 10.0 |
| N—Hydroxyethyl lactamide | 5.0 |
| Noigen P (surface active agent, made by Dai-Ichi Kogyo Seiyaku Co., Ltd.) | 0.1 |
| Water | 82.0 |
| Magenta Ink: | |
| Dye* | 1.6 |
| Diethylene glycol monoethyl ether | 0.5 |
| N—Methyl-2-pyrrolidone | 15.0 |
| Noigen P | 0.3 |
| Water | 82.6 |
| Yellow Ink: | |
| Dye (C.I. Acid Yellow 49) | 2.8 |
| Diethylene glycol | 1.0 |
| 2,2'-Thiodiethanol | 16.0 |
| Noigen P | 0.2 |
| Water | 80.0 |
| Black Ink: | |
| Dye (C.I. Acid Black 155) | 3.5 |
| Diethylene glycol monoethyl ether | 1.0 |
| N—Methyl-2-pyrrolidone | 20.0 |
| 2,2'-Thiodiethanol | 20.0 |
| Noigen P | 0.1 |
| Water | 55.4 |

*:

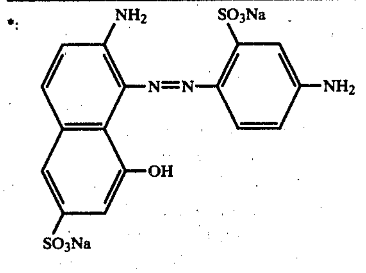

EXAMPLE 2

After beating 100 parts of LBKP at a water leaking property CSF 430 ml, 0.2 part of a polyamideepichlorohydrin was added thereto and then a base paper having a weight of 100 $g/m^2$ was manufactured by means of Fourdriner paper machine to provide Recording Sheet No. 6.

Then, the Recording Sheet No. 6 was impregnated with a commercially available mordant (Sanfix 70, made by Sanyo Chemical Industries, Ltd.) in a dry solid content of 3 $g/m^2$ to provide ink jet Recording Sheet No. 7.

Also, the Recording Sheet No. 6 was impregnated with the basic latex polymer, Compound (5) of this invention in a dry solid content of 3 $g/m^2$ to provide ink jet Recording Sheet No. 8.

Using the ink jet recording sheets thus-obtained, multicolor ink jet recording was performed as in Example 1, and the results shown in Table 2 were obtained.

TABLE 2

| Recording Sheet No. | Water Resistance Property of Image | Image* Density | Diameter of Ink Dot (μ) |
|---|---|---|---|
| 6 (Comparison) | Poor | 1.10 | 250 |
| 7 (Comparison) | Good | 1.18 | 170 |
| 8 (Invention) | Excellent | 1.26 | 150 |

*Density of three color overlapped portion.

The Recording Sheet No. 8 of this invention showed no change of the image formed when the sheet was immersed in water, showed less diffusion of ink, and provided images having high image density.

EXAMPLE 3

A commercially available calico cloth composed of warps and woofs of 40# single yarn, each 70 yarns per inch was used as an ink jet Recording Sheet No. 9.

The Recording Sheet No. 9 was impregnated with 5 $g/m^2$ of polyethyleneimine and dried to provide an ink jet Recording Sheet No. 10.

The Recording Sheet No. 9 was impregnated with 5 $g/m^2$ of the basic latex polymer, Compound (5) of this invention and dried to provide an ink jet Recording Sheet No. 11.

Using the ink jet recording sheets thus-obtained, multicolor ink jet recording was performed as in Example 1.

When these cloths having the ink jet records were washed with water, the cloth of Recording Sheet No. 11 of this invention showed no dissolution of dye and showed no change of image after drying the cloth was washed, while in comparison Recording Sheet No. 10, the dye dissolved considerably and the image density reduced considerably after drying the cloth thus washed. Moreover, in comparison Recording Sheet No. 9, almost all images vanished.

EXAMPLE 4

Polyester film of 100μ thick which had been subjected to corona discharging treatment was coated with a coating composition containing 5% Compound (2), the polymer latex of this invention, 3% gelatin, 0.3% polyamide-polyamine-epichlorohydrin resin, and 5% calcium carbonate in one-side dry solid content of 5 $g/m^2$ by means of a bar coater and dried to provide an ink jet Recording Sheet No. 12.

In the same way as above, except that the basic latex polymer was not used, an ink jet Recording Sheet No. 13 was also prepared.

Using the ink jet recording sheets, multicolor ink jet recording was performed as in Example 1. The results are shown in Table 3.

TABLE 3

| Recording Sheet No. | Water Resistance Property of Image | Flowing of* Ink in Ink Jet Recording | Image** Density |
|---|---|---|---|
| 12 (Invention) | Excellent | None | 1.50 |
| 13 (Comparison) | Poor | Observed | 1.43 |

*Flowing of ink at 2-color piled portion and 3-color piled portion.
**Density of cyan ink.

As shown in Table 3, the Recording Sheet No. 12 of this invention showed no flowing of ink at ink jet recording, gave images having good water resistance property, and the images formed did not change when they were immersed in water.

While the invention has been described in detail and with reference to specific embodiments thereof, it will be apparent to one skilled in the art that various changes and modifications can be made therein without departing from the spirit and scope thereof.

What is claimed is:

1. An ink jet recording sheet for forming a recorded image by jetting thereonto an aqueous ink containing as a water-soluble dye a direct dye or acid dye having an anionic dissociable group, comprising at least one water insoluble basic latex polymer incorporated in or on a base support.

2. An ink jet recording sheet as in claim 1, wherein the water insoluble basic latex polymer is represented by formula (I)

$$-(A)_x-(B)_y-(C)_z- \quad (I)$$

wherein -(A)- represents a polymeric unit formed by copolymerizing a copolymerizable monomer having a tertamino group or a quaternary ammonium group; -(B)- represents a polymeric unit formed by copolymerizing a copolymerizable monomer having at least two ethylenically unsaturated groups; -(C)- represents a polymeric unit formed by copolymerizing copolymerizable ethylenically unsaturated monomers other than the monomers used for forming -(A)- and -(B)-; x is from 10 to 99 mol%; y is from 0 to 10 mol%; and z is from 0 to 90 mol%.

3. An ink jet recording sheet as in claim 2, wherein x is from 30 to 99 mol%; y is from 1 to 8 mol%, and z is from 10 to 80 mol%.

4. An ink jet recording sheet as in claim 2 or 3, wherein the polymeric unit -(A)- is represented by formula (II), (III), or (IV)

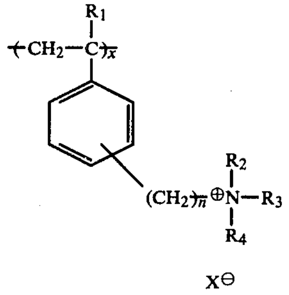
(II)

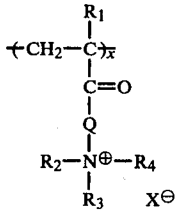
(III)

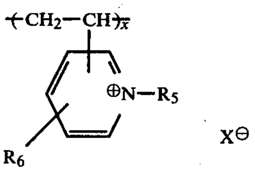
(IV)

wherein $R_1$ represents a hydrogen atom or a lower alkyl group having from 1 to 6 carbon atoms; $R_2$, $R_3$, or $R_4$ each represents an alkyl group having from 1 to 6 carbon atoms, or an aralkyl group having from 7 to 10 carbon atoms, and said $R_2$, $R_3$, and $R_4$ may combine with each other to form a cyclic structure; $X^{\ominus}$ represents an anion, and n represents an integer of 0 to 2.

5. An ink jet recording sheet as in claim 4, wherein the polymeric unit represented by $-(C)-$ is derived from ethylene, propylene, butene-1, isobutene, styrene, α-methylstyrene, vinyltoluene, acrylic acid, methacrylic acid, a monoethylenically unsaturated ester of a fatty acid, an ethyleneically unsaturated monocarboxylic acid or dicarboxylic acid ester, a monoethylenically unsaturated compound, or a diene.

6. An ink jet recording sheet as in claim 2 or 3, wherein the polymeric unit represented by $-(B)-$ is derived from a monomer having the formula (V)

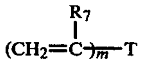
(V)

wherein $R_7$ represents a hydrogen atom or methyl group, T represents a group bonding to the vinyl group selected from the group consisting of an amide group, an ester group, an alkylene group, and an arylene group, and m represents an integer of 2 4.

7. An ink jet recording sheet as in claim 2 or 3, wherein the polymeric unit represented by $-(C)-$ is derived from ethylene, propylene, butene-1, isobutene, styrene, α-methylstyrene, vinyltoluene, acrylic acid, methacrylic acid, a monoethylenically unsaturated ester of a fatty acid, an ethylenically unsaturated monocarboxylic acid or dicarboxylic acid ester, a monoethylenically unsaturated compound, or a diene.

8. An ink jet recording sheet as in claim 1, 2, or 3, wherein the content of the water insoluble basic latex polymer is from 0.1 to 20 g/m² of the support.

9. An ink jet recording sheet as in claim 8, wherein the base support is paper.

10. An ink jet recording sheet as in claim 1, 2, or 3, wherein the content of the water insoluble basic latex polymer is from 0.5 to 5 g/m² of the support.

11. An ink jet recording sheet as in claim 10, wherein the base support is paper.

12. An ink jet recording sheet as in claim 1, 2, or 3, wherein the base support is paper.

13. An ink jet recording sheet for forming a recorded image by jetting thereonto an aqueous ink containing as a water soluble dye a direct dye or acid dye having a anionic dissociable group, comprising at least one water insoluble basic latex polymer incorporated in or on a base support, wherein the basic latex polymer is represented by the formula (I)

$$-(A)_x-(B)_y-(C)_z- \quad (I)$$

wherein the polymer unit (A) is represented by formula (II), (III) or (IV)

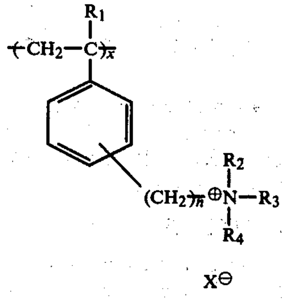
(II)

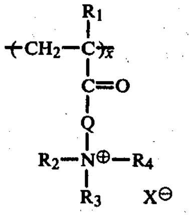
(III)

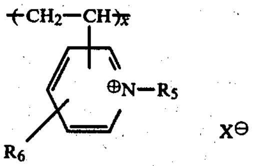
(IV)

wherein $R_1$ represents a hydrogen atom or a lower alkyl group having from 1 to 6 carbon atoms; $R_2$, $R_3$, or $R_4$ each represents an alkyl group having from 1 to 6 carbon atoms, or an aralkyl group having from 7 to 10 carbon atoms, and said $R_2$, $R_3$, and $R_4$ may combine with each other to form a cyclic structure; $X^{\ominus}$ represents an anion, and n represents an integer of 0 to 2, wherein the polymeric unit represented by $-(B)-$ is derived from a monomer having the formula (V)

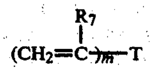
(V)

wherein $R_7$ represents a hydrogen atom or methyl group, T represents a group bonding to the vinyl group selected from the group consisting of an amide group, an ester group, an alkylene group, and an arylene group, and m represents an integer of 2 to 4, and wherein the polymeric unit represented by $-(C)-$ is derived from ethylene, propylene, butene-1, isobutene, styrene, α-methylstyrene, vinyltoluene, acrylic acid, methacrylic acid, a monoethylenically unsaturated ester of a fatty acid, an ethylenically unsaturated monocarboxylic acid or dicarboxylic acid ester, a monoethylenically unsaturated compound, or a diene; and wherein the base support is paper.

* * * * *